(12) United States Patent
Schläfer

(10) Patent No.: US 6,924,747 B2
(45) Date of Patent: Aug. 2, 2005

(54) SYSTEM FOR EXCHANGING DATA

(75) Inventor: Wolfgang Schläfer, Kuhardt (DE)

(73) Assignee: Common-Link AG, Kuhardt (DE)

(*) Notice: Subject to any disclaimer, the term of this patent is extended or adjusted under 35 U.S.C. 154(b) by 651 days.

(21) Appl. No.: 10/113,624

(22) Filed: Mar. 27, 2002

(65) Prior Publication Data

US 2002/0113874 A1 Aug. 22, 2002

Related U.S. Application Data

(63) Continuation-in-part of application No. PCT/DE00/03372, filed on Sep. 27, 2000.

(51) Int. Cl.[7] .............................................. G08C 19/16
(52) U.S. Cl. .......................... 340/870.16; 340/870.02; 340/870.01; 379/106.01
(58) Field of Search ................. 340/870.02, 870.03, 340/870.01, 870.16; 379/106.06, 106.07, 106.01

(56) References Cited

U.S. PATENT DOCUMENTS

| | | | | |
|---|---|---|---|---|
| 5,239,575 A | * | 8/1993 | White et al. | 379/106.06 |
| 5,311,581 A | * | 5/1994 | Merriam et al. | 379/106.07 |
| 5,420,799 A | * | 5/1995 | Peterson et al. | 702/62 |
| 5,448,230 A | * | 9/1995 | Schanker et al. | 340/870.03 |
| 5,491,473 A | * | 2/1996 | Gilbert | 340/870.01 |
| 5,594,740 A | * | 1/1997 | LaDue | 455/410 |
| 6,100,817 A | * | 8/2000 | Mason et al. | 340/870.02 |
| 6,195,018 B1 | * | 2/2001 | Ragle et al. | 340/870.01 |
| 6,285,868 B1 | * | 9/2001 | LaDue | 455/410 |
| 6,351,223 B1 | * | 2/2002 | DeWeerd et al. | 340/870.03 |

* cited by examiner

Primary Examiner—Albert K. Wong
(74) Attorney, Agent, or Firm—Klaus J. Bach

(57) ABSTRACT

In a system for the exchange of data, including a teleservice terminal apparatus, a user apparatus adapted to exchange data with the teleservice terminal apparatus, a central control unit having access to a public communication network, and a subcontrol unit connectable to the teleservice terminal apparatus and to the central control unit, the teleservice terminal apparatus transmits data of a particular event to the subcontrol unit which includes a first table for a first evaluation of the data and, depending on the result, transmits the data to the central control unit for a second evaluation on the basis of a second table before transmission to a certain user apparatus.

11 Claims, 1 Drawing Sheet

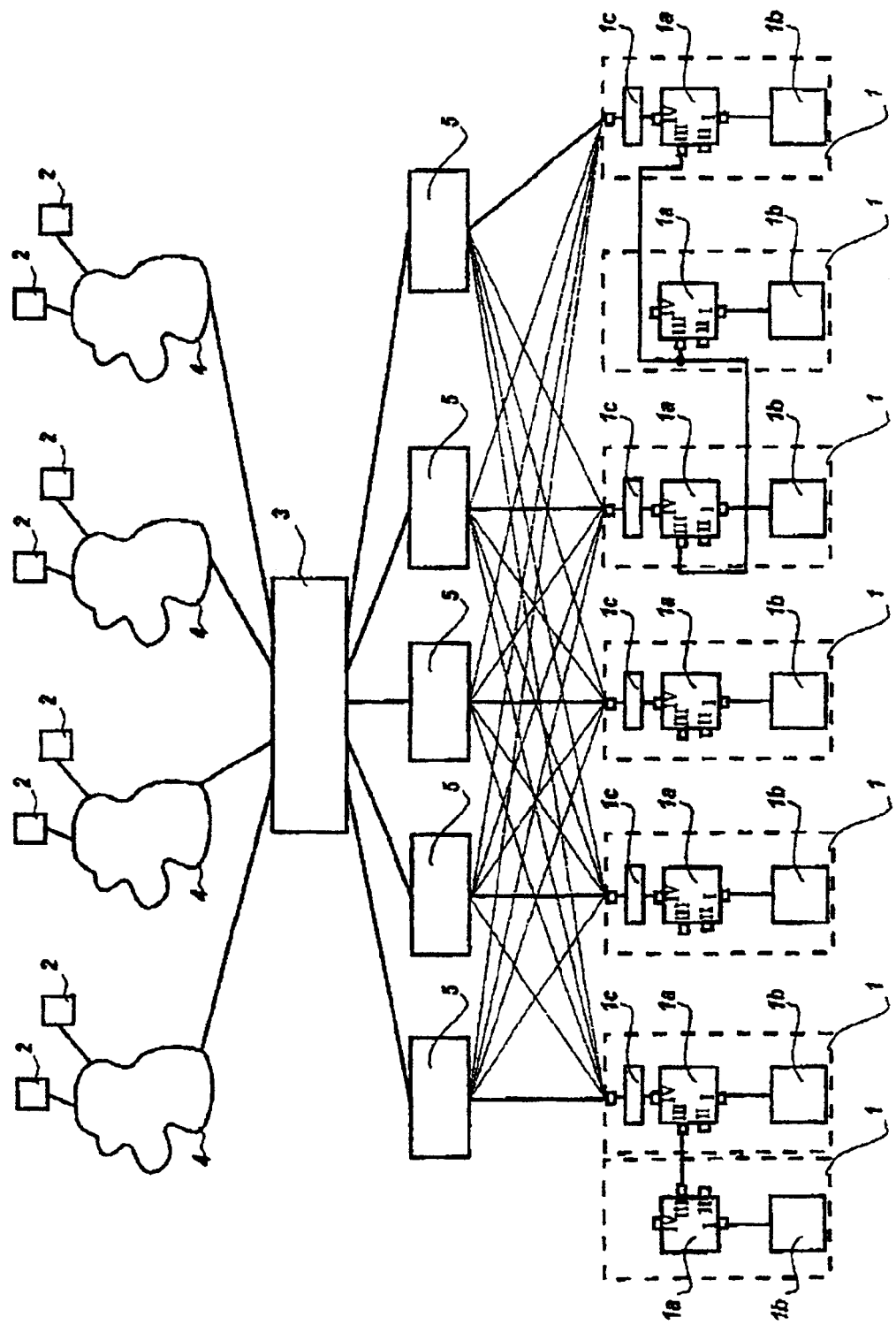

SYSTEM FOR EXCHANGING DATA

This is a Continuation-In-Part application of International application PCT/DE00/03327 filed Sep. 27, 2000 and claiming the priority of German application 199 46 534.7 filed Sep. 28, 1999.

BACKGROUND OF THE INVENTION

The invention relates to a system for exchanging data comprising at least one teleservice terminal and at least one user device which can exchange data with the teleservice terminal.

Such a system is known for example from teleservicing. Teleservicing comprises the surveillance and the control of spatially remote objects. The teleservicing includes for example the reporting of switching states, the recording of measurement values, and meter readings or the providing of switching orders in the electric energy distribution systems.

In the known systems, a connection is established between a user apparatus and the apparatus to be surveilled or controlled. Depending on the type of surveillance or, respectively, the control, the connection between the user apparatus and the apparatus being surveilled must be constantly maintained since, in certain cases, it is necessary that the state of the apparatus being surveilled is transmitted immediately to the user apparatus. The constant connection between the user apparatus and the apparatus required herefor is relatively expensive however.

Furthermore, the apparatus being surveilled and the user apparatus must be tuned to one another. Generally, it is not possible to survey a multitude of different types of apparatus with a single user apparatus. In this respect, the known systems are not flexible.

With the known systems, it is furthermore not possible to change the location of the user apparatus without any problems. With the known system, certain particular connections are necessary for the apparatus to be surveyed and the user apparatus so that for example the user apparatus can be employed only where such a connection is available. Similar considerations apply to the apparatus to be surveilled.

It is the object of the present invention to provide a system for the exchange of data by way of which apparatus can be surveyed in a simple manner by user apparatus, wherein the user apparatus and the apparatus to be surveilled can be used in a flexible manner that is at different locations.

SUMMARY OF THE INVENTION

In a system for the exchange of data, including a teleservice terminal apparatus, a user apparatus adapted to exchange data with the teleservice terminal apparatus, a central control unit having access to a public communication network, and a subcontrol unit connectable to the teleservice terminal apparatus and to the central control unit, the teleservice terminal apparatus transmits data of a particular event to the subcontrol unit which includes a first table for a first evaluation of the data and, depending on the result, transmits the data to the central control unit for a second evaluation on the basis of a second table before transmission to a certain user apparatus.

In accordance with the invention, the system for the exchange of data includes at least a teleservice terminal apparatus, or apparatus to be surveilled, and at least one user apparatus which can exchange data with the teleservice terminal apparatus. The system according to the invention further includes a central control unit, which has at least access to a public communication network and can be connected to one of the user apparatus, which is a terminal apparatus of the communication network. Furthermore, at least one sub-control unit is present which can be connected on one hand with the teleservice terminal apparatus and on the other with the central control unit. The teleservice terminal apparatus transmits, on the basis of an event, certain predetermined data to one of the subcontrol units. The subcontrol units include each a first table by way of which the data are evaluated. The data are transferred to a central control unit depending on a first evaluation. In the central control unit, a second evaluation is performed by means of a second table on the basis of which the data are transmitted to a particular user apparatus.

With the system according to the invention, remote apparatus can be surveilled and controlled in a simple manner. For this purpose, an apparatus to be surveilled or a plant to be surveilled is connected to a teleservice terminal apparatus. Only an adaptation between the teleservice terminal apparatus and the apparatus to be surveilled is to be established. The connection of the teleservice terminal apparatus to the system according to the invention is standardized. In this way, any apparatus to be surveilled can be connected to the system. Since the teleservice terminal apparatus is substantially less expensive than a personal computer, the surveillance of an apparatus with the system according to the invention can be realized relatively inexpensively.

With the teleservice terminal apparatus, the system is completely independent of the apparatus to be surveilled. Therefore, even a total failure of the surveilled apparatus can be safely diagnosed. With the standardization of the connection setup achieved by the terminal apparatus, a communication by way of a telephone connection is possible which may be independent of the apparatus being surveilled. Furthermore, apparatus to be surveilled can be included in the system in a simple manner. By communication via a telephone connection, even apparatus located far from any infrastructure can be included in the surveillance system by way of a wireless telephone connection.

Since, with the system according to the invention, the communication of the teleservice terminal apparatus with a user apparatus is event-controlled, only small connection costs occur. Nevertheless, the apparatus being surveilled is under constant surveillance.

Since the user apparatus are terminal apparatus of a public communication network, a user can employ a teleservice terminal apparatus in a flexible manner. If the user apparatus is for example a wireless telephone, the user is independent of a particular location. At the same time, the user can determine that, for example, automatic messages of certain teleservice terminal apparatus are directed to a certain teleservice terminal apparatus are directed to a certain user apparatus such as a telefax. If the telefax machine is located for example at a servicing station appropriate necessary actions can be taken immediately.

With a network of the teleservice terminal apparatus and the subcontrol units and a network of the subcontrol units as well as the teleservice terminal apparatus, a network can be generated which ensures a high availability and which is very flexible.

With the system according to the invention, it is made sure that unauthorized users cannot communicate with the teleservice terminal apparatus: Since the user apparatus have only access to the central control unit, a direct access of the user apparatus to the teleservice terminal apparatus is not possible. In the central control unit, the authorization of a user can be examined and authorization can then be given so that a particular teleservice terminal apparatus communicates with the respective user apparatus. In order to prevent unauthorized communication with a teleservice terminal apparatus, an incoming connection demand is checked as to whether it originates from a subcontrol unit or the central control unit.

With the first table present in the subcontrol unit, data can be collected so that, upon the establishment of a connection between the respective subcontrol unit and the central control unit, a multitude of data can be transmitted. The connection of the subcontrol unit with the central control unit is established—like the other connections—by way of the public communication lines, for example, by way of the telephone net of the German Telekom. It is particularly advantageous as far as the connecting costs are concerned that, upon establishment of a connection between a subcontrol unit and the main control unit, all data preliminarily stored in the subcontrol unit are transmitted to the central control unit. It is therefore not necessary to establish a separate connection for data, which do not need to be transmitted immediately.

A similar advantage is obtained with an embodiment of the invention wherein the data available in a teleservice terminal apparatus are examined in the teleservice terminal apparatus whether they are to be transmitted immediately to a subcontrol unit or whether they should be preliminarily stored in the teleservice terminal apparatus. By collecting non-urgent messages in an interim storage, which do not need to be transmitted to a user immediately, a multitude of individual connection establishments can be saved. The data remaining stored in the teleservice terminal apparatus can be surveilled to make sure that they are transmitted within a certain time limit. In this way, it is ensured that also data, which are not urgent, are transmitted after a certain maximum period.

An embodiment of the invention is particularly advantageous wherein there is a third table which comprises a comparison table by way of which data contained in an interim storage in a teleservice terminal apparatus are subjected to a third evaluation and, depending thereon, are placed for example into a non-urgent storage area ready for transmission, and an action table by way of which it is determined under which circumstances a connection is established from the teleservice terminal apparatus to a respective subcontrol unit and which includes a connection table including connection paths to the subcontrol units. In this way, data present in the teleservice terminal apparatus can be transmitted at low costs and with high reliability.

It has also been found to be particularly advantageous if it is determined, by way of the second evaluation, whether the data received by the central control unit are to be transmitted immediately to a user apparatus. In this way, additional connection setups can be eliminated. Since the data of all teleservice terminal apparatus are supplied to the central control unit, the central control unit handles a large number of data. Data, which do not need to be transmitted immediately to a user apparatus are transmitted to a particular user apparatus only when the central control unit has received data, which have to be transmitted immediately to the respective user apparatus. Otherwise, the data are stored in the central control unit where they can be called up by the user apparatus at any time. With the collection of data, the number of connections to be established can be substantially reduced. Furthermore, the data stored in the central control unit can be examined for additional characteristics wherein, based on the examination results, certain data can be automatically transmitted.

An embodiment of the invention wherein the second table of the central control unit and/or the first table of the teleservice terminal apparatus can be generated or overwritten is also very advantageous. In this way, the system can easily be adapted to changing conditions. If for example, a subcontrol unit fails, the tables of the terminal apparatus which are to be addressed first by this subcontrol unit, can be so changed that they address first another subcontrol unit. This is particularly advantageous for the reliability of the data transmission.

Particularly advantageous however is an embodiment of the invention wherein the central control unit has a first storage area, wherein, as a result of the reception of an error message of a subcontrol unit, the third tables of respective teleservice terminal apparatus are overwritten. However, the third tables of the respective teleservice terminal apparatus are not overwritten at the initiation of a user, but automatically only as a result of such error message of a subcontrol unit. The central control unit then also recognizes a total failure of a subcontrol unit.

In a further embodiment of the invention, the central control unit includes a second storage area for the reception of a control signal of a user apparatus whereby a respective teleservice end apparatus is initiated to transmit data. In this simple manner, unauthorized communicating with the teleservice terminal can be prevented: Since the user apparatus can only address the central control unit, a user apparatus cannot directly reach the teleservice terminal apparatus.

With the last mentioned embodiment, it is advantageous if the teleservice terminal apparatus have an input by means of which they can be activated for a data transmission. Such activation is based on the control signal of a user apparatus or it is based on the demand from the central control unit resulting from an error signal.

Further details, features and advantages of the present invention will be described below on the basis of the accompanying drawing.

BRIEF DESCRIPTION OF THE DRAWING

The sole FIGURE shows schematically a system according to the invention.

DESCRIPTION OF PREFERRED EMBODIMENTS

As shown in the FIGURE, the system according to the invention includes a central control unit 3 to which, at one side, subcontrol units 5 are connected. At the other side, the central control unit 3 is in communication with public communication networks 4. The communication networks 4 may be for example the T-net or the ISDN net of the German Telekom or the Internet. It is therefore possible that terminal apparatus 2 of the communication networks 4 communicate with the central control unit 3.

The subcontrol units 4 are interconnected with remote apparatus 1 (1a, b . . . ) which each consist of a teleservice terminal apparatus 1a and an apparatus 1b to be surveilled. In this way, connections can be established from a remote terminal apparatus 1 with several subcontrol units 5. The subcontrol units 5 may also be interconnected whereby the subcontrol units 5 can also directly communicate.

The teleservice terminal apparatus 1a may be in the form of single level computers with transient and non-transient storage connections and several ports. A first port I provides for communication with the apparatus 1b to be surveilled. This apparatus 1b may for example be a USV-plant. When port I is occupied a remote user can communicate with the apparatus by way of a second port II, by way of which the connection with the apparatus 1b is then established without the need for severing the connection between the apparatus 1b to be surveilled and the teleservice terminal apparatus 1a.

In another operational mode of the teleservice terminal apparatus 1a, the third table may be changed by way of the second port II.

A third port III at the teleservice terminal apparatus 1a is in the form of a data bus and facilitates the local interconnection of several teleservice terminal apparatus 1a for the surveillance of additional equipment at the same location.

A fourth port IV serves as a connection for a modem 1c.

Preferably, the teleservice terminal apparatus 1a is an independent component including its own processor so that it is independent of the apparatus 1b to be surveilled and makes it possible to report a total failure of the apparatus being surveilled.

As apparent from the left side of the figure, a second teleservice terminal apparatus 1a, which is connected to a second surveilled apparatus 1b can be connected, by way of a third port III, to another teleservice terminal apparatus 1a, whereby a modem 1a can be saved.

At the right side of the figure, an alternative possibility is shown, wherein three teleservice terminal apparatus 1a are interconnected by way of the third port III, in such a way that two of the three teleservice terminal apparatus 1a have one modem 1c. With the interconnection, the interconnected teleservice terminal apparatus 1a can communicate by way of each of the two modems 1c with subcontrol units 5. This is particularly advantageous for the reliability of the system.

A teleservice terminal apparatus 1a is in constant communication with an apparatus 1b to be surveilled by way of the first port I, which may be a serial port.

The operating data of the apparatus 1b to be surveilled which may be for example a USV, are read permanently from the teleservice terminal apparatus 1a by means of a protocol specific for the apparatus to be surveilled and are provisionally stored. The provisionally stored data are evaluated with the aid of a comparison table and, depending on the evaluation, are held ready for teletransmission in a non-transient storage area.

If, for example, the temperature of the apparatus 1b under surveillance is excessively high, this is determined in a teleservice terminal apparatus 1a by comparison with a first given value. The temperature value is then marked as critical, provided with a time stamp from a clock of the teleservice terminal apparatus 1a and is recorded in the non-transient exit storage. If the temperature raises further and exceeds a second predetermined value, the respective temperature value is marked as particularly critical and is deposited in the exit storage together with a time stamp.

Also, functional interrelations are recorded and evaluated. If, for example, the communication between a teleservice terminal apparatus 1a and the apparatus 1b to be surveilled breaks down, this situation could be rated critical after a certain time and, after a further elapse of time, the situation could be rated very critical.

A telecommunication routine in the teleservice terminal apparatus constantly examines the exit storage and establishes a connection to a subcontrol unit depending on the results of the evaluations. The telecommunication routine uses herefor an action table in which it is determined, under which conditions a connection is to be established, and also a connection table, which includes the connection paths to the subcontrol units 5.

The action table determines for example that a connection needs to be established when the exit storage includes a temperature value rated as very critical. It may also determine that a connection must be established when the exit storage includes a temperature value which is rated critical and it is at the same time determined that a collapse of the communication between the teleservice terminal apparatus 1a and the apparatus 1b to be surveilled has occurred which is rated critical. It may also be determined by means of an action table that a connection is established at a certain time even if there are no critical values in the exit storage. Furthermore, a connection can be established when a predetermined amount of data is present in the exit storage. Another reason for the establishment of a connection is always a connection demand from a subcontrol unit 5 or the central control unit 3, which demand is recognized by a teleservice terminal apparatus.

The telecommunication routine establishes a connection with a subcontrol unit 5 by taking a first connection path from the connection table and initiates, by way of the fourth port IV of the teleservice terminal apparatus, a connected modem 1c to establish a connection to the address corresponding to the first connection path. If the connection to the desired subcontrol unit 5 is established, an identification number of the teleservice terminal apparatus is supplied to the subcontrol unit, a call reason corresponding to the action table is given, the data are transmitted to the subcontrol unit 5, the successful receipt is acknowledged and the connection is again separated from the teleservice terminal apparatus 1a. The data sets transmitted are marked accordingly by the telecommunication routine in the exit storage and the procedure is concluded as having been successful. The telecommunication routine is then again in the start-out state.

If the connection according to the first connection path is not established for example because the respective connection of the subcontrol unit 5 is busy, other communication paths are tried out, preferably to the same subcontrol unit 5. If those tries are also not successful because there is a problem with the subcontrol unit 5, it is tried to establish a connection by way of other subcontrol units 5 until a connection can be established.

If several teleservice terminal apparatus 1a are locally networked and at least two of them have an access to a communication network, the connection demand may also be passed on among the teleservice terminal apparatus 1a. If, for example, the analog telephone connection which is accessed by a teleservice terminal apparatus 1a, is out of service because the telephone equipment has failed, the connection demand can be established by way of a second teleservice terminal apparatus 1a using an ISDN line or by way of a third teleservice terminal apparatus 1a using wireless access in order to transmit the data of the first teleservice terminal apparatus 1a to an accessible subcontrol unit 5.

The data received by the subcontrol unit 5 can be preliminarily stored by this subcontrol unit or they can be immediately transmitted to the central control unit 3. This is decided by the subcontrol unit 5 depending on the access reason stated by the teleservice terminal apparatus 1a. If the data contain for example particularly critical values, the call is marked with a corresponding mark as provided in the action table of the teleservice terminal apparatus 1a and is immediately passed on. The data of a routine call of the teleservice terminal apparatus 1a at a certain time however can be preliminarily stored by the subcontrol unit 5 in order to transmit them to the central control unit 3 together with data of other teleservice terminal apparatus in a larger data packet.

The central control unit 3 forms the connection between the subcontrol unit 5 and the communication networks used by the user apparatus 2. It is the purpose of the central control unit 3 to store, evaluate, and handle the data which arrive from the teleservice terminal apparatus 1a by way of the subcontrol unit 5 as well as the data which are supplied by the user apparatus 2 and transmitted by way of the communication networks 4, so that an automatic information exchange between the teleservice terminal apparatus 1a and the user apparatus 2 is possible without a direct communication therebetween.

The central control unit 3 has access to the communication network 4, for example, an analog and digital long distance telephone network, wireless communication network or a public data network such as an IP network. The graphically guided interaction with the user is realized for example by way of the internet. Error messages may be transmitted selectively by way of E-mail, Fax, or wireless transmission (SMS) Simple inputs of the user such as acknowledging an error report may also be transmitted by telephone or wireless transmission.

The central control unit 3 may be divided into several different task areas. The central control unit 3 may include for example a user management, terminal apparatus management, the administration of rights, a terminal apparatus data area and a clock.

For the user management, the central control unit 3 includes storage areas to which the user has access by way of forms in order to input personal data such as the calling number, his mobile phone, his fax number or his e-mail address.

For the terminal apparatus management, the central control unit 3 includes storage area to can be accessed by the user by way of forms which have been deposited in the central control unit 3 in order to input data concerning the teleservice terminal apparatus 1a or respectively, the apparatus 1b to be surveilled, for example the calling number of the modem connection, the country in which the apparatus under surveillance is operated, the type of the apparatus 1b to be surveilled etc. This is furthermore where the selection is made, by which user apparatus 2 an eventual error message of a remote apparatus 1 is to be issued. Furthermore, it is defined herein under which circumstances any reports should be generated. The central control unit 3 then changes automatically the respective tables in the subcontrol units 5 and the teleservice terminal apparatus 1a.

For the administration of the rights, the central control unit 3 includes storage areas, which can be accessed by certain users by way of forms in order to determine access rights of ancillary users. It can, for example, be determined that a particular service employee is authorized to inspect only the measurement values of a certain group of apparatus under surveillance, but a technical management person also may change the comparison tables by way of which the teleservice terminal apparatus 1a evaluates the measurement values.

For the terminal apparatus data area, the central control unit 3 includes storage areas in which the data of the remote apparatus 1 are continually stored in order to make for example long-term analyses possible.

In the central control unit 3, there is also a central clock with which clocks in the subcontrol units 5 as well as clocks present in the teleservice terminal apparatus 1a can be synchronized with each connection to the teleservice terminal apparatus 1a.

Below the communication within the system according to the invention is described on the basis of three examples.

FIRST EXAMPLE

Supplying Information to a User

The data of a remote apparatus 1 are evaluated in the central control unit 3 using conditions defined by the user and, dependent thereon, are transmitted to a user apparatus 2. In this way, the user obtains, through his mobile telephone as user apparatus 2, a short note when in his terminal apparatus 1b being surveilled for example the temperature exceeds the comparison value stored in the respective teleservice terminal apparatus.

However, the user may also receive by e-mail the measurement values present at a certain time, for example at noon. To this end, he only has to initiate such action by entering the desired time for such a transmission into a respective form of the central control unit 3 to cause the central control unit to send a message by way of the subcontrol unit 5 to the respective teleservice terminal apparatus to enter, by way of the connection established to the subcontrol unit 5, the respective time into the comparison table of the teleservice terminal apparatus. The value to be entered into the table of the teleservice terminal apparatus 1a can already be transmitted to the subcontrol unit 5 upon transmission of the connection demand of the central control unit 3 to the subcontrol unit 5.

SECOND EXAMPLE

The Return Channel to the User Apparatus

The user indicates in a form, which the central control unit 3 sends by way of the communication network 4 to the respective user apparatus 2, for example a personal computer with a browser, that he wants to acknowledge for example an error message and wants to switch off for example an alarm which signals the error at the respective remote apparatus 1. The filled-in form is then returned to the control unit 3. The central control unit 3 retrieves then from its terminal area the respective call number of the teleservice terminal apparatus 1a and transmits this order to the subcontrol unit 5, which is in first place in the connection table of the teleservice terminal apparatus 1a. The subcontrol unit 5 signals the teleservice terminal apparatus 1a connection demand by dialing the call number of the teleservice terminal apparatus 1a. The teleservice terminal apparatus 1a recognizes the connection demand by evaluation of the call information at its fourth port IV and calls the subcontrol unit 5 back. Now the connection is established and the subcontrol unit 5 orders the teleservice terminal apparatus 1a to switch the alarm off.

After the examination of the authorization, the teleservice terminal apparatus acknowledges the demand and terminates the connection, wherein the positive acknowledgement signal is sent from the subcontrol unit 5 to the central control unit 3 in a time-delayed manner. Then the respective demand is passed on from the teleservice terminal apparatus 1a to the apparatus being surveilled 1b and the alarm is turned off.

If the alarm continues, the teleservice terminal apparatus 1a recognizes the situation by evaluation of the return message from the apparatus 1b being surveilled. It then establishes a connection to the subcontrol unit 5 and provides a corresponding error message. If the subcontrol unit 5 receives the error message before it has sent a positive time-delayed acknowledgement signal to the central control unit 3, it suppresses the positive acknowledgement signal and sends only a negative acknowledgement signal to the central control unit 3. From the central control unit 3, the user input can then be acknowledged to the user in a positive or negative sense.

THIRD EXAMPLE

Initial Installation of the Teleservice Terminal Apparatus

Based on the data supplied to the central control unit 3 by way of the user apparatus 2 and the communication network 4 and the additional data stored in the central control unit 3, the actual concrete connection table, the comparison table and the action table are generated by the central control unit for the teleservice terminal apparatus 1a and transmitted as initialization order to the subcontrol unit 5. The initialization order may also contain the communication routine, which is used by the teleservice terminal apparatus for its communication with the apparatus to be surveilled 1b.

The subcontrol unit 5 initializes the teleservice terminal apparatus 1a by dialing the call number of the teleservice terminal apparatus, establishing a connection, inquiring the serial number of the teleservice terminal apparatus, transmitting the table during this connection to the respective storage area in the teleservice terminal apparatus 1a and separating the connection. The subcontrol unit 5 acknowledges this procedure toward the central control unit 3 by transmitting a data set of the first acknowledgement including at least the call number of the teleservice terminal apparatus 1a and its serial number.

The teleservice terminal apparatus examines the tables and itself established a connection to a subcontrol unit 5. If this connection is successful, the correct data exchange with the subcontrol unit 15 is acknowledged by the subcontrol unit to the teleservice terminal apparatus 1a, whereupon the teleservice terminal apparatus 1a is locked. From here on, the teleservice terminal apparatus 1a does not permit the establishment of a connection from the outside and establishes a communication with the apparatus 1b to be surveilled. A copy of the acknowledgement is transmitted by the subcontrol unit 5 to the central control unit 3. By this transmission together with the first acknowledgement, the central control unit 3 is caused to set up a terminal apparatus data area for the remote apparatus 1 and to acknowledge this to the respective user apparatus 2.

If the teleservice terminal apparatus 1a is, for example because of an error in the connection table, not able to reach a subcontrol unit 5 with a predetermined number of tries, the teleservice terminal apparatus is ready for a new initialization.

If a positive acknowledgement or a negative acknowledgement by the subcontrol unit 5 is received, the central control unit 5 recognizes an error condition and can repeat the initialization with changed tables or it can inform the user about the error by sending a message to the user apparatus 2.

What is claimed is:

1. A system for the exchange of data, including at least one teleservice terminal apparatus, at least one user apparatus capable of exchanging data with the teleservice terminal apparatus, and a central control unit which has access to a public communication network and which can be connected to a user apparatus which may be a terminal apparatus of said communication network, and at least one subcontrol unit connectable on one hand to the teleservice terminal apparatus and, on the other hand, to the central control unit, said teleservice terminal apparatus transmitting, as a result of an event, corresponding predetermined data to a subcontrol unit, which includes a first table on the basis of which a first evaluation of the data occurs, and which transmits the data, depending on the first evaluation, to said central control unit wherein the data are subjected to a second evaluation on the basis of a second table before transmission to a certain user apparatus.

2. A system according to claim 1, wherein with said first evaluation, it is determined whether the data are to be transmitted immediately to said central control unit or the data should be preliminarily stored in the subcontrol unit.

3. A system according to claim 2, wherein, with a decision that the evaluated data should be transmitted from the subcontrol unit to the central control unit, all data stored in the subcontrol unit are transferred to the central control unit.

4. A system according to claim 1, wherein data available in a teleservice terminal apparatus are examined by means of a third table to determine whether they should be transmitted immediately to a subcontrol unit or whether they should be preliminary stored in said teleservice terminal apparatus.

5. A system according to claim 4, wherein said third table includes a comparison table, on the basis of which data stored preliminarily in the teleservice terminal apparatus are subjected to a third evaluation, and, depending on the evaluation, the data are held ready in a storage area, and an action table, on the basis of which it is determined under which circumstances a connection is established from the teleservice terminal apparatus to a respective subcontrol unit, and a connection table which contains connection paths to the subcontrol unit.

6. A system according to claim 1, wherein, based on the second evaluation, it is determined whether the data received by the subcontrol unit from the central control unit are transmitted immediately to a user apparatus.

7. A system according to claim 6, wherein by way of said second table of said central control unit, it is also determined to which user apparatus the data are transmitted if the data are immediately transmitted.

8. A system according to claim 1, wherein at least one of the second table of said central control unit, the first table of said subcontrol unit and the third table of said teleservice terminal apparatus can be generated by said user apparatus.

9. A system according to claim 4, wherein said central control unit has a first storage area for the reception of an error message of a subcontrol unit, wherein, based on the error message of the subcontrol unit, the third table of a respective teleservice terminal apparatus is written over.

10. A system according to claim 9, wherein said central control unit includes a second storage area for the reception of a control demand of a user apparatus by way of which a particular teleservice terminal apparatus is activated for a data transmission.

11. A system according to claim 10, wherein said teleservice terminal apparatus have an input for the activation of a data transmission procedure.

* * * * *